United States Patent Office 3,573,256
Patented Mar. 30, 1971

3,573,256
EPOXIDE SUBSTITUTED POLYTHIOUREA POLY-AMINO COMPOUND AND COMPOSITION THEREOF WITH 1,2-POLYMERIC EPOXIDE
Shiro Kudo, Sakai-shi, and Shinichi Tsurugi, Koichi Nagaoka, and Jun Hayasaki, Tokyo-to, Japan, assignors to Kyowa Hakko Kogyo Kabushiki Kaisha, Tokyo-to, Japan
No Drawing. Continuation-in-part of application Ser. No. 616,493, Feb. 16, 1967, which is a continuation-in-part of application Ser. No. 441,866, Sept. 30, 1965. This application July 23, 1969, Ser. No. 844,177
Int. Cl. C08g 30/14
U.S. Cl. 260—47                                                13 Claims

ABSTRACT OF THE DISCLOSURE

An epoxide resin is formed by reacting a 1,2 polymeric organic epoxide with the reaction product of ethylene oxide and polythiourea amine, said polythiourea amine having been formed by reacting monomeric polyamine with thiourea. The aforesaid 1,2 epoxide resin possesses solvent resistant and tenacious properties, and is utilizable in adhesives, coating materials, solvents, etc.

CROSS REFERENCE TO RELATED APPLICATIONS

This application is a continuation-in-part of Ser. No. 616,493, filed Feb. 16, 1967 and now abandoned, which application is a continuation-in-part of Ser. No. 441,866, filed Sept. 30, 1965.

SUMMARY OF INVENTION

In accordance with this invention, an epoxide polymer can be formed by reacting at temperatures of from about 10° C. to 100° C., ethylene oxide with a polythiourea polyamino compound in an amount sufficient to provide from about 0.02 to about 3.0 mols of ethylene oxide per reactive groups in the polythiourea polyamino compound. The polythiourea polyamino compound is formed in accordance with this invention by condensing at a temperature of from about 140° C. to 270° C. from about 0.2 to about 2.0 mols of thiourea with one mol of a monomeric organic polyamino compound.

In the case where the ethylene oxide is present in an amount of from about 0.02 to about 1.2 mols per reactive amino group in said polyamine polythiourea compound, a viscous liquid is formed. This viscous liquid can be further reacted to provide a solid epoxide resin with a polymeric 1,2 epoxide wherein the polymeric epoxide is present in an amount to provide from 0.02 to 1.8 reactive 1,2 epoxy group per reactive amino groups in the liquid.

DETAILED DESCRIPTION

The polymeric epoxy substituted polythiourea polyamino compounds produced by this reaction have a wide variety of valuable industrial uses. This is seen by the fact that when the polymeric epoxy substituted polythiourea compound is formed by reacting the polythiourea polyamino compound with the ethylene oxide wherein the ethylene oxide is present in an amount to provide from about 0.02 to about 1.2 reactive epoxy groups per reactive amino groups, a viscous liquid having a viscosity of from about 40 to 10,000 cps. (measured at 25° C.) is produced, These liquids all have the following properties:

(a) High viscosity and solubility in solvents such as methanol and the like and no noticeable trace of an ammonia odor at room temperatures.

(b) Exhibit strong cationic properties due to the presence of nitrogen radicals in the molecule, and exhibit excellent surface active properties due to the presence of hydrophobic radicals and polarized radicals in molecule.

(c) Provide instantaneous curing agents for epoxy resins even at room temperature.

(d) Exhibit poly-cationic coagulative properties. Therefore these liquid compounds are extremely useful as cationic active and surface active agents, as curing agents for epoxy resins, and as coagulants for various substances.

When ethylene oxide is reacted with a polythiourea polyamino compound in an amount sufficient to provide from about 1.2 to about 3 moles of ethylene oxide per reactive amino group, a polymeric product is produced which can harden at room temperatures to produce a compound having three dimensional configuration.

These products are solid since they harden rapidly at room temperature. Additionally, the properties of these compounds include: insolubility in solvents, such as methanol and the like, excellent stability, little odor, good flexibility, high strength, and high heat resistance. Furthermore these polymeric resins have wide-spread industrial applications due to the instantaneous curing property such as adhesives and as coating agents and in paints and in molding materials.

In the case where the viscous liquid is produced by reacting ethylene oxide with the polyamino polythiourea compound in an amount to provide 0.2 to 1.2 moles of ethylene oxide per reactive amino group in said polyamino polythiourea, this liquid can be used to produce cured epoxy resins. The cured epoxy resins are prepared by reacting the amino containing liquid with a polymeric 1,2-epoxy compound in an amount sufficient to provide 0.02 to 1.8 reactive 1,2-epoxy groups per reactive amino groups in the liquid. These cured epoxy resins can be used as coating agents, adhesives, in paints and in molding materials. These cured epoxy polymers are solid, have excellent stability and are insoluble in conventional solvents such as alcohols.

The polythiourea polyamino compounds having at least two primary reactive amino groups which are utilized in producing the compounds of this invention are formed by the condensation of one mol of a polyamine containing at least two reactive primary amino groups with about 0.2, to about 2.0 mols of thiourea at a temperature of from about 140° C. to about 270° C. Generally, it is preferred that these condensation products have a molecular weight of from about 1,000 to about 3,000. This condensation reaction can be carried out by any of the conventional methods of condensing an amine with thiourea. A typical method of carrying out this reaction is by heating thiourea with a polyamine at a temperature of about 140° to about 270° C. while removing the ammonia gas that is formed. The ammonia may be removed by agitating the reaction mixture in a nitrogen stream.

Any polyamine containing at least two reactive primary amino groups can be utilized as the starting material in producing the polymeric polythiourea compound of this invention. Typical polyamines which can be utilized in accordance with this invention include the alkylene or polyalkylene polyamines which contain from about 2 to 24 carbon atoms. A typical alkylene diamine compound which may be utilized in accordance with this invention includes ethylene diamine, tetramethylene diamine, hexamethylene diamine, nonamethylene diamine and the like. Typical polyalkylene triamine compounds which may be utilized in accordance with this invention include diethylene triamine, triethylene tetramine, tetraethylene pentamine, hexamethylene heptamine, di-(hexamethylene)-triamine, tri-(hexamethylene)-tetramine, tetrahexamethylene-pentamine etc. Aryl diamino compounds such as diamino benzene may be utilized in producing the polymers of this invention.

The reaction between the polyamine and thiourea is carried out by condensing one mol of the polyamine with from about 0.2 to 2 mols of thiourea at a temperature of about 140° C. to about 270° C. while removing the ammonia which is formed by the reaction. The sulphur containing organic amino compounds formed by this reaction has at least two primary reactive amino groups and can be represented by any of the following formulas:

$$H_2N(-RNHCSNH-)_mH \qquad (A)$$

$$H_2NCSNH(-RNHCSNH-)_mH \qquad (B)$$

$$H_2N-(RNHCSNH)_mRNH_2 \qquad (C)$$

wherein R is an alkyl, an alkyl or aryl radical containing from 2 to 24 carbon atoms, $m$ is an integer from 1 to 20 carbon atoms.

In the case where the polythiourea polyamino compound is produced by the reaction of thiourea with nonamethylene diamine in equimolar amounts at 160° C. for about 15 minutes, the product obtained contains predominantly a compound having the following structural formula:

$$H_2NCSNH(-C_9H_{18}NHCSNH-)_2C_9H_{18}NH_2$$

The molecular weight of this product was observed to increase when the condensation reaction was carried out for a longer period of time. In another case, the polythiourea polyamino compound produced by the reaction of thiourea with dimethylene triamine in equally molar amounts at about 150° C. to 160° C. for a peirod of about 60 minutes had the following structure formula:

$$NH_2(C_2H_4NHCSNH)_2H$$

The molecular weight of this product was observed to increase slightly when the reaction was carried out for a longer period of time.

The reaction between the ethylene oxide and the polythiourea polyamino compound is carried out so that there is present from about 0.02 mol to about 3 mols of reactive epoxide groups per reactive amino groups contained within the polythiourea polyamino compound. The reaction between ethylene oxide and the polythiourea polyamino compound can be carried out by simply mixing these two components together at room temperature. If desired, the reaction mixture can be heated to temperature of about 200° C. Generally it is preferred that the reaction be carried out at a temperature of from about 10° C. to about 130° C. for a period of from about 1 minute to about 60 minutes. If the mol ratio of reactive epoxy groups within the reaction mixture is from about 0.02 to about 1.2 per reactive amino group, then the final polymeric epoxide substituted thiourea derivative that is formed is a viscous liquid having a molecular weight of from 140 to 10,000 and having a viscosity of about 40 cps. to about 10,000 cps. (measured at 25° C.). On the other hand, if the ratio of reactive epoxy groups within said reaction mixture is from about 1.2 to about 3 moles of ethylene oxide per reactive amino groups, the reaction mixture hardens to produce a solid substance in accordance with this invention. If desired temperature of 100° C. or above can be utilized to speed up the hardening of the reaction mixture. This solid polymeric thiourea derivative can be utilized as an adhesive in laminating or in molding.

The reaction of the organic polyamino compound and the epoxy compound is generally exothermic and can be carried out in an open vessel and at room temperature. However, if desired temperatures such as, for example, 60° C. to 130° C. can be utilized. However, temperatures greater than 130° C. are seldom utilized since no additional beneficial results can be obtained by utilizing such high temperatures.

Ethylene oxide can be added to polythiourea polyamino compound in many ways. Ethylene oxide gas can be blown into the polythiourea polyamino compound with or without increased pressure.

When the viscous liquid is formed by reacting ethylene oxide with the polyamino polythiourea compound wherein the ethylene oxide is present in from 0.2 to 1.2 moles per reactive amino group of the polythiourea, this viscous liquid can be reacted with an organic polymeric 1,2-epoxide. These epoxide compounds are polymeric 1,2-epoxide compounds containing a molecular weight of from 150 to 4,000. Typical epoxide resins which can be utilized are the reaction products of epihalohydrins such as epichlorhydrin with phenols, alcohol, acidamides, etc. The reaction between the 1,2-epoxy resin and the viscous liquid can be carried out at room temperature since curing is instantaneous. However, if desired, the curing can take place at temperatures as high as 200° C.

The invention is further illustrated, but not limited, by the following examples:

In the examples, the amounts are given in parts by weight.

EXAMPLE I

A mixture containing 316 parts of nonamethylene diamine and 152 parts of thiourea was reacted by heating the mixture to a temperature of about 160° C. under constant agitation in a nitrogen stream. The mixture was maintained at this temperature under constant agitation for a period of 60 minutes while the ammonia gas and hydrogen sulfide (Trace) which was liberated by the reaction was passed into the nitrogen stream. After this period the heating was stopped and the resulting reaction product from this mixture (reaction product I) was cooled to room temperature. 380 parts of this reaction product was obtained. This product was a polythiourea polyamine containing two reactive primary amino radicals. This product was a transparent viscous liquid at room temperature and had a viscosity of 6,500 cp. at 25° C. Furthermore, this product was insoluble in water, benzene, toluene and xylene and was soluble in dilute hydrochloric acid, acetic acid, methanol, diethylene triamine and ethylene glycol.

EXAMPLE II 100 parts of reaction product I was mixed with 14 parts of ethylene oxide by blowing the ethylene oxide gas into the reaction product I. The mixture of the reaction product and ethylene oxide gas was heated to 130° under constant stirring. The temperature of 130° C. and stirring were maintained for a period of about two hours. After this period, an epoxy substituted polythiourea polyamino derivative (reaction product II) was obtained. The reaction product II was a transparent viscous liquid having a viscosity of about 20,000 cps. at 25° C. This product was stable and had little ammonia like odor at room temperature. The solubility of this reaction product was similar to that of reaction product I.

EXAMPLE III 100 parts of the reaction product II was added at ambient temperatures to 80 parts of an epoxide resin formed by the condensation of 4,4 - dihydroxy-diphenylpropane with epichlorhydrin and having an epoxide equivalent of 190. The mixture of the epoxide resin and reaction product II was stirred for about 1 to 2 minutes and allowed to remain at room temperature. After 2 or 3 minutes of standing at room temperature. The reaction mixture began to harden to produce a hardened resin (reaction product III). The obtained resin (reaction product III) was stable and resistant to acid and water.

As seen from the above, reaction product II is capable of hardening epoxy resins in a very short period of time so that the reaction products I and II can be utilized for hardening epoxy resins to produce an adhesive for such things as metal and concrete structures, etc.

EXAMPLE IV

To 100 parts of polythiourea polyamino compound (reaction product I), 30 parts of phenyl-glycidyl ether was added dropwise under constant agitation at 25° C. The addition of the ether to this reaction product I produced an exothermic reaction. After all of the ether was added, the mixture of phenyl glycidyl ether and polythiourea polyamino compound was heated to 80° C. This temperature was maintained for a period of 1 hour whereupon a polymeric thiourea substituted polythiourea derivative (reaction product IV) was formed. Reaction product IV which was a transparent and viscous liquid was stable at room temperature and possessed no trace of an ammonia like odor. The obtained liquid product possessed similar characteristics with the polythiourea polyamino derivative produced in accordance with Example II when subjected to chemical tests. The reaction product can be used for similar purposes as reaction product II.

EXAMPLE V 13 parts of reaction product IV was added slowly at room temperature to 30 parts of an epoxy resin formed by the reaction of 4,4-dihydroxy diphenyl propane with epichlorohydrin and having an epoxide equivalent of 190. This reaction mixture hardened after standing at room temperature for about 2 to 3 minutes. The product formed (reaction product V) was a stable substance.

EXAMPLE VI

To 100 parts of reaction product I there was added dropwise under constant agitation at room temperature 15 parts of an epoxide resin (Epikote 828 sold by Shell International Chemical Corp.) formed by reacting 4,4-dihydroxy-diphenyl propane with epichlorhydrin having an epoxide equivalent of 190. As soon as the epoxide compound was added to reaction product I an exothermic reaction occurred. After all of the epoxide compound was added, the mixture was heated to 80° C. This temperature was maintained for a period of 1 hour whereupon an epoxide substituted polythiourea polyamino derivative was formed (reaction product VI). Reaction product VI was a liquid at room temperature and had a viscosity of 15,000 cps. at 25° C. This product was stable at room temperature and had no noticeable trace of an ammonia-like odor. This product was soluble in dilute hydrochloric acid, aqueous acetic acid, glycol, methanol and insoluble in water, benzene, ethyl acetate, pyridine and trichloroethylene.

To 100 parts of this reaction product VI there was added dropwise at room temperature 15 parts of an epoxide resin (Epikote 828) prepared by the reaction of 4,4-dihydroxy-diphenyl-propane and epichlorhydrin and having an epoxide equivalent of 190. Immediately after mixing, this mixture was coated by means of a knife on the surface of two steel plate sheets each having dimensions of 1 mm. by 130 mm. by 25 mm. These sheets had been prepared for coating by pickling and thereafter washing with water. The mixture was applied to each of the steel plates so as to provide each of the steel plates with a coating of about 1 mm. in thickness. The two sheets were then pressed together and left at room temperature for a period of 24 hours so as to form an assembly. During this period the mixture hardened to form a solid adhesive bond between the steel plates. After this period, the tensile strength and heat resistance of the adhesive bond between the two steel plates was determined. The tensile strength was about 100 kg. per square cm. and the heat resistance of the bond was 150° C.

Three adhesives were prepared in like manner by adding 10 parts by weight of the reaction product of Example I (reaction product I) to each of 20 parts by weight, 13 parts by weight and 7 parts by weight of the epoxide resin formed by condensing 4,4-dihydroxy diphenyl propane with epichlorohydrin having an epoxide equivalent of 190. Each of these adhesives were knife-coated on a steel plate in the manner indicated above. In all cases the mixture began to harden after 10 minutes of standing at room temperature.

EXAMPLE VII 122.3 parts of hexamethylene diamine and 76 parts of thiourea were reacted under the same conditions as those of Example I to produce a polythiourea polyamino compound (reaction product VII). This reaction product was a syrup-like liquid having a viscosity of 1600 cps. at 24° C. and had an amine value of 320 mg. KOH per gram.

100 parts of reaction product VII was added slowly to 8.5 parts of phenylglycidyl ether under constant agitation. Agitation was continued for one hour so that the polymeric epoxy substituted polythiourea polyamino derivative was obtained (reaction product VIII). A hydrochloric acid solution containing 10% by weight of reaction product VIII was prepared. This solution had no noticeable trace of an ammonia-like odor and was observed to be stable. This hydrochloride solution was then diluted with water to form an aqueous solution containing 0.1% by weight of the reaction product No. VIII. 1 gram of this reaction product was added to 1000 grams of an aqueous suspension containing 5% by weight of diatomite which had a turbidity of 2%. After agitation of the suspension with the aqueous solution for approximately 3 minutes, a clear solution having a turbidity of 50% was obtained. As seen from this example, the epoxide substituted polythiourea derivatives of this invention can be utilized as coagulants in the form of their hydrochloride solution for treating polluted water in towns, industrial facilities, etc. It was noted that the effects of the epoxide substituted polythiourea derivative prepared in accordance with this example had a coagulant effect equal to that of about 80 to 100 grams of aluminum sulphate $(Al_2(SO_4)_3 \cdot 18H_2O)$.

EXAMPLE VIII

To 100 parts of a methanol solution containing 10% by weight of reaction product VII there was added 50 parts by weight of epichlorohydrin utilizing the conditions set forth in Example I. The product that was obtained was a 33% by weight methanol solution of an epoxide substituted polythiourea polyamino derivative (reaction product IX). The methanol solution of reaction product IX was observed to be stable and have no noticeable trace of an ammonia-like odor. This methanol solution was diluted with water to form an aqueous solution containing 0.1% by weight of reaction IX. 20 grams of this aqueous solution was added to 1000 grams of colored industrial water having a 420 m$\mu$ absorption of 49.8% under constant agitation. After agitation for 3 minutes a clear solution was obtained having a 420 m$\mu$ absorption of 95.5%. In a comparative test 1000 grams of this colored industrial water having a 420 m$\mu$ absorption of 49.8% had added thereto 180 grams of aluminum sulphite under constant agitation. After agitation for approximately 15 minutes, the colored solution had a 420 m$\mu$ absorption of 80%. As seen from these results, the product of this invention is much more superior in clearing colored industrial water than aluminum sulphate which is a commonly used coagulant.

EXAMPLE IX 387 parts of diethylene triamine and 282 parts of thiourea were reacted under the same conditions as set forth in Example I. 545 parts of a polythiourea polyamine compound was obtained (reaction product X).

This product was a transparent viscous liquid having a viscosity of 35,000 cps. at 25° C. 15 parts by weight of phenyl glycidyl ether was added to reaction product X under agitation, thereby producing an exothermic reaction. After all of the phenyl glycidyl ether was added to reaction product X, agitation was continued for about 1 hour so that 115 parts of an epoxide substituted polythiourea polyamino derivative was obtained (reaction product XI). Reaction product XI was a liquid which had a viscosity of 15,000 cps. at 25° C. This liquid had no noticeable trace of an ammonia like odor and was stable.

EXAMPLE X

Equimolar amounts of hexamethylene diamine and ammonium rhodanate were reacted in the manner outlined in Example I. The reaction product (reaction product XII) which was obtained by this reaction was a yellowish, transparent, viscous liquid having a viscosity of 9,500 cps. at 30° C. 100 parts of this liquid was added to 15 parts by weight of an epoxide resin formed from the reaction of 4,4'-dihydroxy-diphenyl-propane with epichlorhydrin and having an epoxide equivalent of 190. After all of the liquid was added to the epoxide resin, the resulting mixture was agitated at room temperature for approximately one hour. After this period, a viscous liquid of an epoxide substituted polythiourea polyamino derivative was formed (reaction product XIII).

Reaction product XIII was tested as a hardening agent. This was performed by adding reaction product XIII to 70 parts of a viscous liquid of an epoxide resin formed by the reaction of a primary copolymer of phenol resin with an alkaline epichlorhydrin at 30° C. in the presence of 5 parts of toluol and 20 parts of a titanium oxide powder. After mixing for a few minutes the resulting material was coated on the surface of a concrete structure. After 15 minutes standing at room temperature the coated layer was observed to be semi-solid. After 12 hours the coated layer was stable, tough solid white colored surface.

EXAMPLE XI

A mixture of 292 parts of triethylene tetramine and 72 parts of thiourea was reacted together for 60 minutes at room temperture to form 324 parts of a polythiourea polyamino compound (reaction XIV). Reaction product XIV was a yellowish transparent viscous liquid at room temperature with a viscosity of 200 cps. at 25° C. To 100 parts of reaction product XIV, there was added 20 parts of phenyl glycidyl ether under constant agitation at room temperature. After all of the glycidyl ether had been added, agitation was continued for one hour whereby 120 parts by weight of the epoxide substituted polythiourea amine was produced (reaction product XV). Reaction product XV was a yellow transparent viscous liquid at room temperature. Both reaction product XIV and XV were extremely useful as hardening agents for non-solvent epoxide paint.

What is claimed is:

1. A composition of matter consisting essentially of an epoxide substituted polythiourea polyamino compound formed by reacting at temperatures of from about 10° C. to about 200° C. an ethylene oxide and a polythiourea polyamino compound having at least two primary reactive amino groups in amounts sufficient to provide from about 0.02 to about 3 mols of ethylene oxide per reactive amino group, said polythiourea amino compound being formed by condensing a temperature of from about 140° C. to about 270° C. one mol of a monomeric organic polyamine containing at least two primary reactive amino groups with from about 0.2 to 2 mols of thiourea.

2. The composition of claim 1 wherein said polythiourea polyamino compound has a molecular weight of from about 1,000 to 3,000.

3. A composition of matter consisting essentially of an epoxide substituted polythiourea polyamino compound in the form of a viscous liquid having a viscosity of from about 40 to 10,000 cps. measured at 25° C. and molecular weight ranging from about 140 to about 10,000 said polymeric epoxide substituted polythiourea amino compound being formed by reacting at temperatures of from about 10° C. to about 200° C., ethylene oxide with a polymeric polythiourea polyamino compound having at least two reactive amino groups in an amount sufficient to provide from about 0.02 to about 1.2 mols of ethylene oxide per reactive amino group contained within said polythiourea polyamino compound, said polythiourea polyamino compound being formed by condensing at a temperature of from about 140° C. to about 270° C. one mol of a monomeric organic polyamine compound containing at least two primary reactive amino groups with from about 0.2 to about 2 mols of thiourea.

4. The composition of matter of claim 3 wherein said monomeric polyamine compound is condensed with an equimolar amount of thiourea.

5. A composition of matter consisting essentially of an epoxide resin said epoxide resin being formed by reacting (1) the reaction product of ethylene oxide with a polymeric polyamine formed by condensing at a temperature of from about 140° C. to about 270° C. one mol of a monomeric organic polyamine compound containing at least two primary amine groups with from about 0.2 to 2 mols of thiourea wherein said ethylene oxide is present in an amount of from about 0.02 to 1.2 mols per reactive amino group contained within said organic polyamine and (2) an organic 1,2 polyepoxide having a molecular weight of from 150 to 4,000 wherein said resin is present in an amount sufficient to provide from about 0.02 to 1.8 reactive epoxide groups per reactive amino groups contained within said reaction product.

6. A solid adhesive material consisting essentially of a polymeric epoxide substituted polythiourea polyamino compound, said epoxide substituted polythiourea polyamino compound being formed by reacting at temperatures of from about 10° C. to about 200° C. ethylene oxide with a polymeric polythiourea polyamino compound having at least 2 primary reactive amino groups in an amount sufficient to provide from about 1.2 to 3.0 mols of ethylene oxide per reactive amino groups contained within said polythiourea polyamino compound, said polythiourea polyamino compound being formed by condensing at a temperature of from about 140° C. to about 270° C. one mol of a monomeric organic polyamine compound containing at least two primary reactive amino groups with from about 0.2 to about 2 mols of thiourea.

7. The composition of claim 6 wherein said monomeric organic polyamine compound is formed by condensing equimolar amounts of said monomeric polyamine with thiourea.

8. A process of preparing a solid polymeric organic epoxide resin consisting essentially of condensing at a temperature of from about 140° C. to about 270° C. one mol of a monomeric organic polyamine compound containing at least two primary reactive amino groups with from about 0.2 to about 2 mols of thiourea to form a polythiourea polyamino compound containing two reactive primary amino groups and reacting said polythiourea polyamino compounds with ethylene oxide in an amount sufficient to provide from about 0.2 to about 3 mols of ethylene oxide per reactive amino groups.

9. The process of claim 8 wherein said monomeric polyamine is condensed with an equimolar amount of thiourea.

10. A process for producing a solid tenacious polymeric 1,2 epoxide resin consisting essentially of reacting an organic polymeric 1,2 epoxy compound with an epoxy polythiourea polyamino compound said epoxy polythiourea compound being formed by condensing at a temperature of from about 140° C. to about 270° C. one mol of a monomeric organic polyamine compound containing at least two primary reactive amino groups with from about 0.2 to about 2 mols of thiourea to form a polythiourea polyamino compound containing two reactive primary amino groups and reacting said polythiourea polyamino compound with ethylene oxide in an amount sufficient to provide from about 0.2 to about 3 mols of ethylene oxide per reactive amino groups.

11. A composition in accordance with claim 1 wherein the monomeric polyamine condensed with the thiourea contains two primary reactive amino groups.

12. A composition in accordance with claim 3 wherein the monomeric polyamine condensed with the thiourea contains two primary reactive amino groups.

13. A composition in accordance with claim 4 wherein the monomeric polyamine condensed with the thiourea contains two primary reactive amino groups.

References Cited

UNITED STATES PATENTS

| | | | |
|---|---|---|---|
| 2,172,747 | 9/1939 | Bowles et al. | 260—2EPOX |
| 2,313,871 | 3/1943 | Hanford et al. | 260—78 |
| 2,713,569 | 7/1955 | Greenlee | 260—47EPCN |
| 2,957,844 | 10/1960 | Wesp | 260—47 |

WILLIAM H. SHORT, Primary Examiner

T. E. PERTILLA, Assistant Examiner

U.S. Cl. X.R.

117—127, 161, 169; 161—184; 210—54; 252—320, 357; 260—79, 552, 830